United States Patent
Mamerski

(10) Patent No.: US 9,622,510 B2
(45) Date of Patent: Apr. 18, 2017

(54) TRANSFER DISC AND ITS USE

(71) Applicant: International Tobacco Machinery Poland Sp. z o. o., Radom (PL)

(72) Inventor: Marcin Mamerski, Radom (PL)

(73) Assignee: International Tobacco Machinery Poland Sp. z o. o., Radom (PL)

( * ) Notice: Subject to any disclaimer, the term of this patent is extended or adjusted under 35 U.S.C. 154(b) by 0 days.

(21) Appl. No.: 15/069,634

(22) Filed: Mar. 14, 2016

(65) Prior Publication Data

US 2017/0013874 A1 Jan. 19, 2017

(30) Foreign Application Priority Data

Jul. 16, 2015 (EP) .................................... 15177148

(51) Int. Cl.
| | | |
|---|---|---|
| *B65G 29/02* | (2006.01) | |
| *B65G 47/84* | (2006.01) | |
| *A24C 5/32* | (2006.01) | |
| *A24D 3/02* | (2006.01) | |

(52) U.S. Cl.
CPC .............. *A24C 5/327* (2013.01); *A24C 5/326* (2013.01); *A24D 3/0287* (2013.01); *B65G 29/02* (2013.01); *B65G 47/846* (2013.01); *B65G 2201/0226* (2013.01)

(58) Field of Classification Search
CPC ........ A24C 5/327; A24C 5/326; B65G 29/02; B65G 47/846; B65G 2201/0226
See application file for complete search history.

(56) References Cited

U.S. PATENT DOCUMENTS

| | | | | | |
|---|---|---|---|---|---|
| 3,380,627 | A | * | 4/1968 | Aidlin ................. | B65G 47/846 198/456 |
| 4,057,138 | A | * | 11/1977 | Grebe ................. | B65G 47/846 198/368 |
| 4,519,492 | A | * | 5/1985 | Focke ................. | B65G 47/846 198/408 |
| 5,040,662 | A | * | 8/1991 | Clark ................. | B65G 47/846 198/408 |
| 6,510,938 | B1 | * | 1/2003 | Bowlin ............. | B21D 51/2692 193/2 R |
| 8,118,721 | B2 | | 2/2012 | Cieslikowski | |
| 8,475,348 | B2 | | 7/2013 | Yanchev | |

(Continued)

FOREIGN PATENT DOCUMENTS

| | | |
|---|---|---|
| JP | H02144203 U | 12/1990 |
| JP | 2012533295 A | 12/2012 |

(Continued)

OTHER PUBLICATIONS

Extended European search report in application 151771482, mailed Feb. 1, 2016.

*Primary Examiner* — Mark A Deuble
(74) *Attorney, Agent, or Firm* — Oppedahl Patent Law Firm LLC

(57) ABSTRACT

The object of the application is a transfer disc (2) for the transferring of tobacco industry's rod-like articles (5) provided with lugs (3), where the disc is characterized in that a front surface (3A) of the lug (3) is inclined in a direction corresponding to the direction (T1) of rotation of the transfer disc (2), and the lug (3) is configured so that it hits a rod-like article (5) above the longitudinal axis (X) of the rod-like article (5).

9 Claims, 4 Drawing Sheets

(56) References Cited

U.S. PATENT DOCUMENTS

| | | |
|---|---|---|
| 8,662,088 B2 | 3/2014 | Owczarek |
| 8,869,969 B2 | 10/2014 | Cieslikowski et al. |
| 8,925,708 B2 | 1/2015 | Cieslikowski et al. |
| 8,967,370 B2 | 3/2015 | Cieslikowski |
| 9,004,261 B2 | 4/2015 | Cieslikowski et al. |
| 9,061,835 B2 | 6/2015 | Gielniewski |
| 9,161,571 B2 | 10/2015 | Sikora |
| 2005/0282693 A1 | 12/2005 | Garthaffner |
| 2009/0127071 A1* | 5/2009 | Otruba ................ B65G 47/846 198/459.2 |
| 2012/0175224 A1* | 7/2012 | Briggs ................ B65G 47/846 198/478.1 |
| 2013/0087056 A1 | 4/2013 | Chojnacki |
| 2014/0011652 A1 | 1/2014 | Cieslikowski et al. |
| 2014/0097107 A1 | 4/2014 | Zagajska |
| 2014/0123826 A1 | 5/2014 | Cieslikowski et al. |
| 2014/0158252 A1 | 6/2014 | Owczarek |
| 2014/0235416 A1 | 8/2014 | Lisowski et al. |
| 2015/0013519 A1 | 1/2015 | Cieslikowski et al. |
| 2015/0047137 A1 | 2/2015 | Gielniewski |
| 2015/0068376 A1 | 3/2015 | Boleslawski |
| 2015/0114543 A1 | 4/2015 | Riedel |
| 2015/0114988 A1 | 4/2015 | Riedel |
| 2015/0342247 A1 | 12/2015 | Ugrewicz |
| 2016/0000142 A1 | 1/2016 | Stanikowski et al. |

FOREIGN PATENT DOCUMENTS

| | | |
|---|---|---|
| WO | 03024898 A2 | 3/2003 |
| WO | 2011008113 A2 | 1/2011 |
| WO | 2011107854 A1 | 9/2011 |
| WO | 2011139169 A1 | 11/2011 |

* cited by examiner

TRANSFER DISC AND ITS USE

BACKGROUND

The object of the invention is a transfer disc for the transferring of rod-like articles of tobacco industry and its use to tobacco industry's rod-like articles containing elements which are not connected or are loosely connected with the article.

The object of the invention may be used in the tobacco industry, in particular with regard to the transport of rod-like articles, in particular of rod-like articles containing elements which are not connected or are loosely connected with an article e.g. granules, loose fillers, aromatic elements and marking elements.

In the tobacco industry, the rod-like articles, both semi-finished and finished products, for example filter rods, cigarettes, etc., are transferred individually or in a mass flow. Individual rod-like articles are transferred directly one after another or at intervals, whereas the transfer is frequently accompanied by a change of direction of articles' movement. The purpose of this invention is in particular to transfer rod-like articles from a feeding device to a receiving device, whereas the rod-like articles being fed have a zero speed in the direction of their axis.

Transfer discs for the transferring of tobacco industry's rod-like articles are known in the prior art, in particular the U.S. Pat. No. 8,475,348 document shows a typical use of a transfer disc for the change of direction in which a tobacco industry's rod-like article is transported. In the solution according to the U.S. Pat. No. 8,475,348 patent a rod-like article is in a rectilinear movement when it gets into the area of action of a first principally horizontally situated transfer disc which changes its direction of movement by 90 degrees. Subsequently, the rod-like article is transferred to a second transfer disc which changes the direction of transport of the rod-like article by 90 degrees by directing the article downwards in a plane which is perpendicular to the plane in which the rod-like article moved before. In this solution, the rod-like article maintains the linear speed of movement along the longitudinal axis, only the direction of this speed is changed, while no accelerations in the axial direction of the article occur.

According to the solution known in the prior art and disclosed in U.S. Pat. No. 8,118,721, a rod-like article is accelerated by a transfer wheel from the zero speed in the direction of the longitudinal axis to the transport speed. In this solution, the rod-like articles are transversely brought into the area of action of the transfer disc i.e. are moved perpendicular to the longitudinal axis. In the area of action of the transfer disc the articles are transferred by a lug of the transfer disc and accelerated to a suitable speed required in the transport system.

Solutions known from the prior art work relatively well in case of rod-like articles with a homogeneous structure or compound rod-like articles whose elements are closely connected with one another. Due to the change of direction of movement of transferred articles, usually used lugs or pushers hit the articles being transferred point-wise causing an impact, which results in the front surfaces of the articles being damaged. In case of rod-like articles containing elements which are not connected or loosely connected with the article there is a problem of negative consequences of such impact e.g. the granules, fillers, tobacco, loose materials spill out, or the marking elements such as marking fibres or aromatic elements such as threads containing aromatic substances slip out.

Moreover, a hit in the bottom edge of a rod-like article causes an unfavourable change of position of the rod-like article as a result of which its front face is unfavourably lifted, and in an extreme case it may result in the rod-like article being turned or thrown out of the transport path.

SUMMARY OF THE INVENTION

The objective of this invention is to introduce a transfer disc which would overcome the problems known from the prior art, i.e. eliminate the damage to the edges of rod-like articles, and the problem of spilling out of granules, fillers, tobacco, loose materials or slipping out of elements in the form of a fibre or a thread at the moment when a rod-like article is hit by the lug.

The substance of the invention is a transfer disc for the transferring of rod-like articles of the tobacco industry provided with lugs, characterised in that a front surface of the lug is inclined in the direction corresponding to the direction of rotation of the disc and the lug is configured in such a way that it hits a rod-like article above the longitudinal axis of the rod-like article.

Furthermore, a transfer disc according to the invention is characterised in that the lug is configured in such a way that the front surface hits a rod-like article parallel to the front surface of the rod-like article.

Furthermore, a transfer disc according to the invention is characterised in that the front surface of the lug is inclined in the direction of movement of the transfer wheel at an angle between 1° and 10° relative to the radius, preferably between 2° and 6°.

Furthermore, the substance of the invention is the use of a transfer disc provided with lugs, whereas the front surface of the lug is inclined in a direction corresponding to the direction of rotation of the disc, and the lug is configured in such a way that it hits a rod-like article above the longitudinal axis of the rod-like article, characterised in that the disc is used to give an initial speed in the axial direction to tobacco industry's rod-like articles containing elements which are not connected or are loosely connected with the article.

Furthermore, the application of the disc according to the invention is characterised in that the disc is used for rod-like articles containing a loose material, in particular charcoal granules, a tobacco filling.

Furthermore, the application of the disc according to the invention is characterised in that the disc is used for rod-like articles containing marking elements, in particular marking fibres.

Furthermore, the application of the disc according to the invention is characterised in that the disc is used for rod-like articles containing aromatic elements in the form of an flavoured thread.

Due to the use of the apparatus according to the invention, unit pressures on the surface of a transferred article for the given parameters of movement, shape and materials caused by the lug are clearly reduced. The pint-wise contact of the lug with the front surface of the article was eliminated. It is particularly important in case of rod-like articles with a rigid and hard structure, e. g. containing distance pieces in the form of tubes.

Furthermore, due to the fact that the lug hits a rod-like article with its entire surface the spilling out of elements which are not connected or are loosely connected with the rod-like article is prevented.

Favourable technical effects consisting in the reduction of the force of pressure on a surface unit and the adherence with the entire surface to the front surface of a rod-like article contribute to the occurrence of a number of advantages of the invention—the rod-like articles are not damaged, and the loose material inside the rod-like article does not spill out, in addition, the marking elements do not slip out from the rod-like article.

BRIEF DESCRIPTION OF THE DRAWINGS

The object of the invention is presented in detail in a preferred embodiment in a drawing in which.

DETAILED DESCRIPTION

Figure 1:
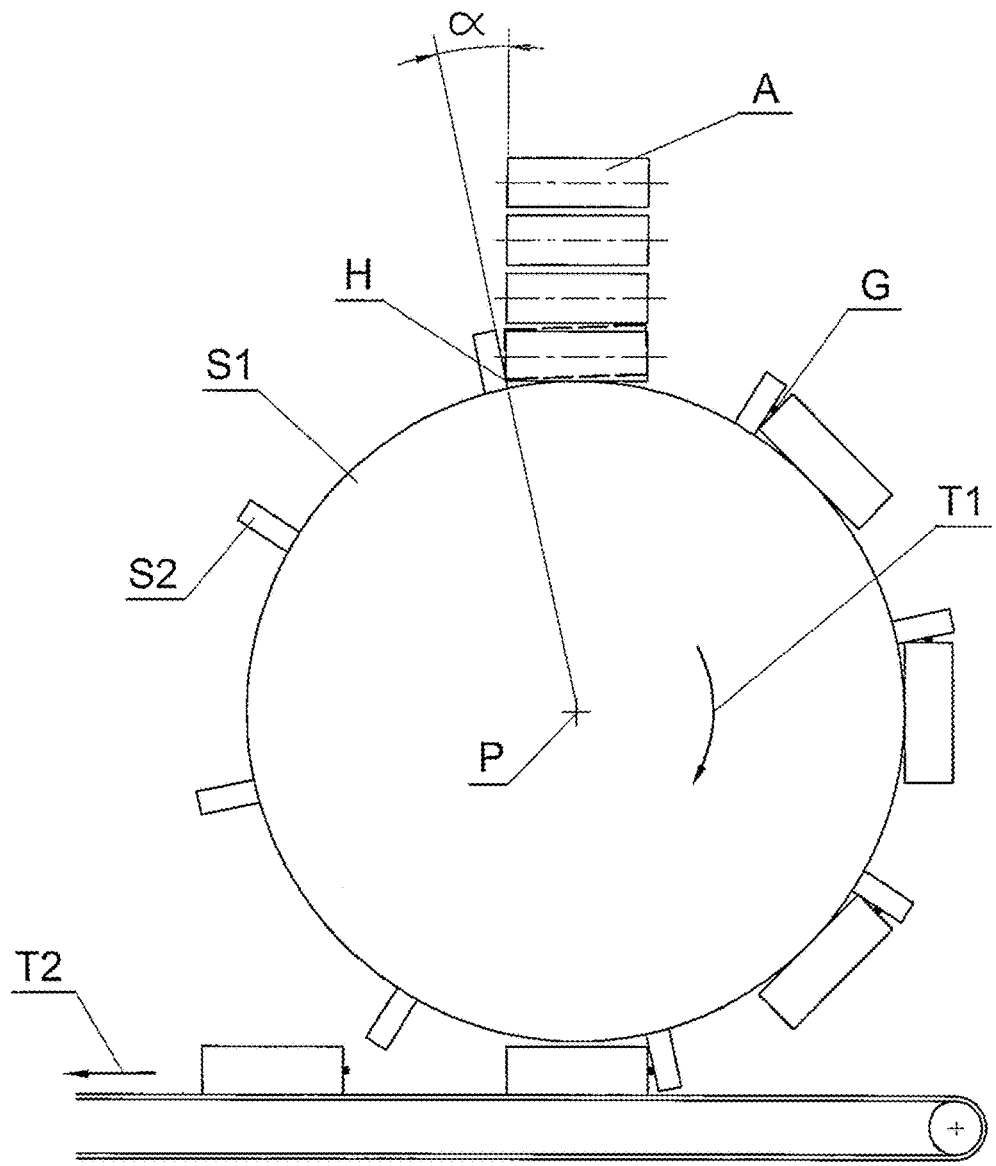
FIG. 1—shows a solution from the prior art.

The solution known from the prior art is shown in FIG. 1 where a transfer disc S1 provided with lugs S2, rotating in the direction T1 takes, one after another, the articles A being fed. The lug S2 hits the article A at a point H below the longitudinal axis of the article A, which may cause a rotation of the article A as shown by broken line, and in addition, at the same point of contact of the article A with the lug S2 a deformation of the article A may occur. An additional problem which arises during the operation of such a device is that the elements which are loosely connected with the article slip out, which was marked as G. An example of an element which is loosely connected with the filter segment is an flavoured thread or another element, centrally situated along the article's axis. The same problem arises when the rod-like article being transferred contains granulated or loose tobacco or filter fibres.

Figure 2:
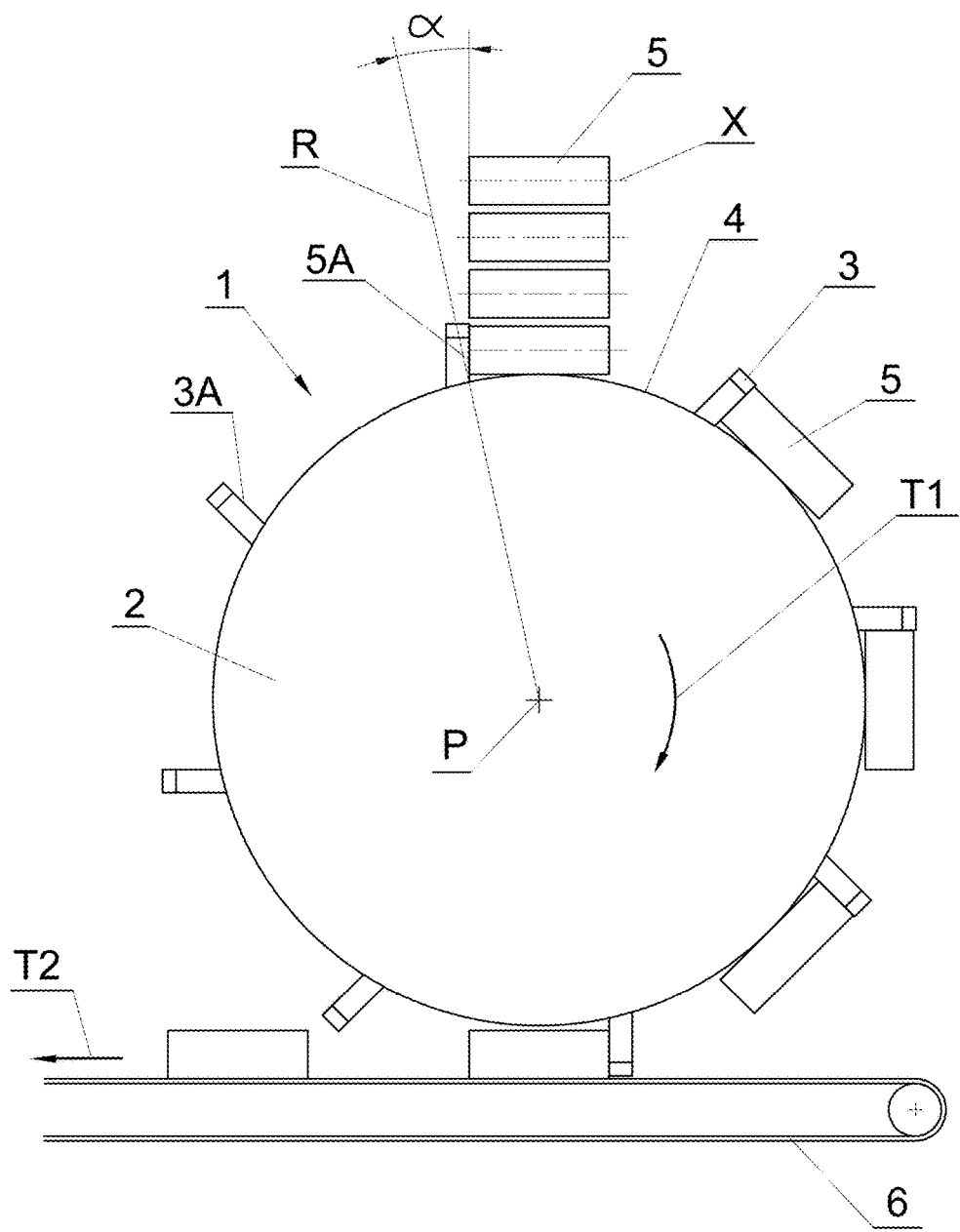
FIG. 2—shows an apparatus according to the invention in a front view.
Figure 3:
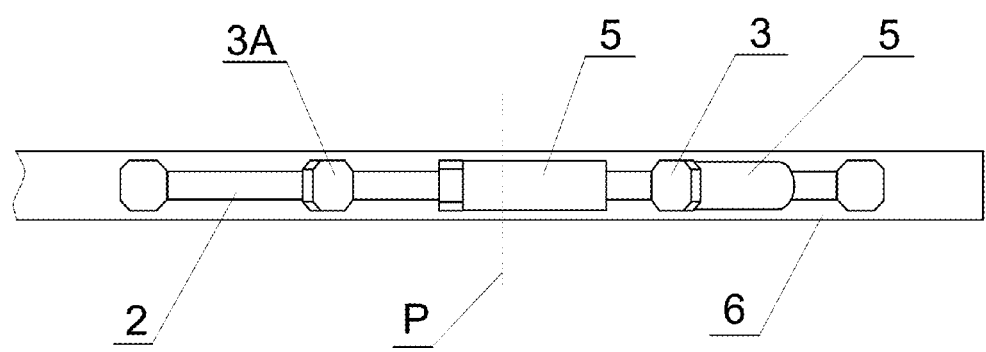
FIG. 3—shows the apparatus of FIG. 2 in a top view.

FIG. 2 shows a fragment of a tobacco industry machine in which the rod-like articles are transferred. The transferring device 1 comprises a transfer disc 2 according to the invention which is adapted to rotate around the axis P in the direction T1. The transfer disc 2 is provided with lugs 3 disposed on the circumference 4. The rod-like articles 5 may be fed from above one after another, whereas the axes X of the rod-like articles 5 are situated horizontally. The front surfaces 3A of the lugs 3 which are adapted to taking the articles 5 and pushing them on a circle downwards as far as to the conveyor 6 with the direction of movement T2 are deflected from the radial direction R by the angle α. The angle α depends on the length of transferred article and may be in the range between 1° and 10°, preferably between 2° and 6°. The inclination of the lugs 3, thus also of the front surface 3A, corresponds to the direction of rotation of the disc 2. The contact of the front surface 3A of the lug with the front surface 5A of the article 5 is a multipoint contact, the points of contact are situated both below the axis X of the article 5 and above that axis, generally the front surfaces 3A and 5A are parallel to each other. Due to such inclination of the front surface 3A the individual pressures which occur on the front surface 5A of the article 5 are distributed on the entire surface 5A. It is advantageous particularly when the rod-like articles are tubular elements and the individual pressures may damage e.g. bend the edge of an article and decrease the quality of transferred article. The configuration of the lug 3 in which during the acceleration of the article the points above the article's longitudinal axis are hit eliminates the risk of article's rotation whilst hitting. In the case when the rod-like article being transferred contains loosely connected elements such elements cannot slip out beyond the front surface of the segment. A top view of the transfer wheel 2 and the conveyor 6 of FIG. 2 is shown in FIG. 3.

Figure 4:
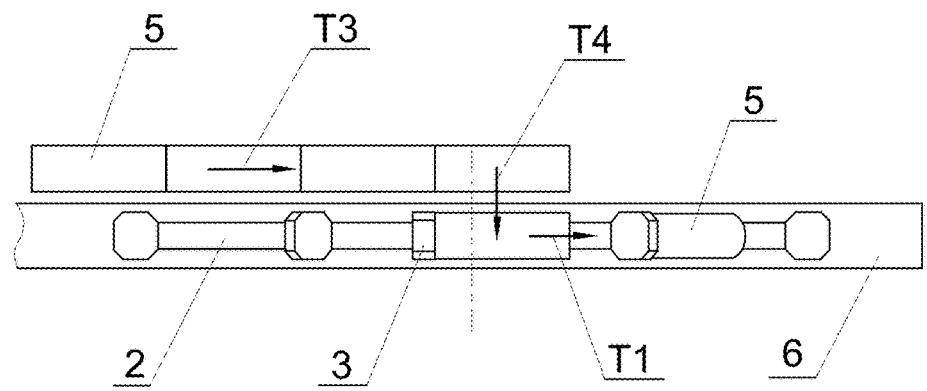
FIG. 4—shows an apparatus according to the invention with an alternative article-feeding method in a top view, FIG. 5—shows an apparatus according to the invention with an alternative article-feeding method in a top view.

Another method of article feeding is shown in FIG. 4. Initially, the rod-like articles move in the principally horizontal direction T3, and then each article is fed in the direction T4 to a point from which it will be taken by the lug 3. The article 5 is transferred further in the direction T1 around the transfer disc 2.

Figure 5:
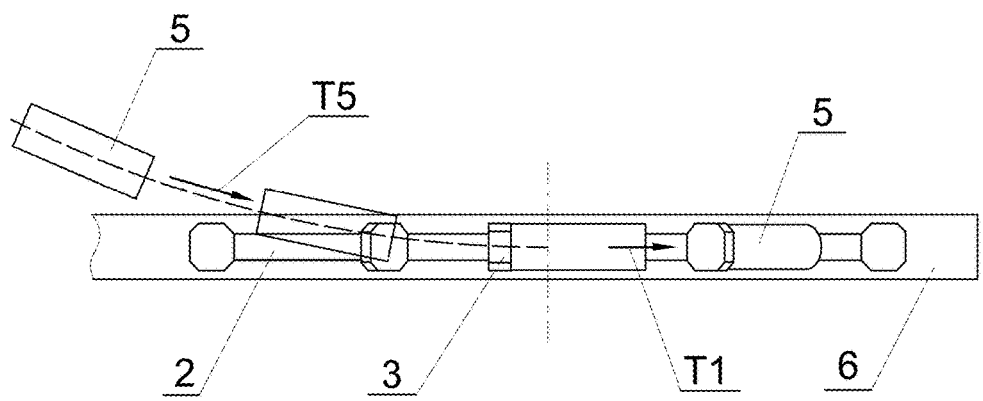

FIG. 5 shows another method for the feeding of rod-like articles 5. Initially, the rod-like articles 5 move at intervals in the direction T5 principally on a circle, tangentially to the plane of the transfer disc 2, and are transferred to a point from which each successive article 5 will be taken by the lug 3. The article 5 is transferred further in the direction T1 around the transfer disc 2.

The invention claimed is:

1. A transfer disc (2) for transferring of rod-shaped articles of tobacco industry provided with lugs (3), characterized in that a front surface (3A) of the lug (3) is inclined in a direction corresponding to a direction (T1) of rotation of the disc (2) and the lug (3) is configured so that the lug (3) strikes the rod-shaped article (5) above the longitudinal axis (X) of the rod-shaped article (5), with the front surface of the lug (3) parallel to the face of the rod-shaped article (5).

2. The transfer disc as in claim 1, characterized in that the front surface (3A) is inclined in the direction (T1) of movement of the transfer disc (2) at an angle (a) between 1° and 10° relative to the radius (R).

3. The transfer disc as in claim 1, characterized in that the front surface (3A) is inclined in the direction (T1) of movement of the transfer disc (2) at an angle (α) between 1° and 10° relative to the radius (R).

4. Use of a transfer disc (2) provided with lugs (3), whereas a front surface (3A) of the lug (3) is inclined in a direction corresponding to a direction (T1) of rotation of the transfer disc (2), and the lug (3) strikes a rod-shaped article (5) with the front surface of the lug (3) parallel to a front surface (5A) of the rod-shaped article (5), to give an initial speed in the axial direction to rod-shaped articles (5) of tobacco industry containing elements which are not connected or are loosely connected with the rod-shaped article.

5. Use as in claim 4, characterized in that the transfer disc (2) is used for rod-shaped articles (5) containing a loose material, in particular a charcoal granules or a tobacco filling.

6. Use as in claim 5, characterized in that the transfer disc (2) is used for rod-shaped articles (5) containing marking elements, in particular marking fibres.

7. Use as in claim 5, characterized in that the disc is used for rod-shaped articles (5) containing aromatic elements in the form of flavoured thread.

8. Use as in claim 4, characterized in that the transfer disc (2) is used for rod-shaped articles (5) containing marking elements, in particular marking fibres.

9. Use as in claim 4, characterized in that the disc is used for rod-shaped articles (5) containing aromatic elements in the form of flavoured thread.

* * * * *